(12) United States Patent
Kasai et al.

(10) Patent No.: US 6,413,673 B1
(45) Date of Patent: Jul. 2, 2002

(54) LITHIUM MENGANES OXIDE SECONDARY BATTERY

(75) Inventors: Masahiro Kasai, Mito; Toshinori Douzono, Miharumachi, both of (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 09/609,375

(22) Filed: Jul. 3, 2000

(51) Int. Cl.$^7$ ............................................... H01M 10/24
(52) U.S. Cl. ............................... 429/231.95; 429/218.1
(58) Field of Search ......................... 429/218.1, 231.95

(56) References Cited

U.S. PATENT DOCUMENTS

| 4,507,371 | A | | 3/1985 | Thackeray et al. |
|---|---|---|---|---|
| 5,316,877 | A | | 5/1994 | Thackeray et al. |
| 5,674,645 | A | * | 10/1997 | Amatucci et al. ............ 429/224 |
| 5,700,597 | A | * | 12/1997 | Zhong et al. ................ 429/218 |
| 5,759,720 | A | * | 6/1998 | Amatucci .................... 429/224 |
| 5,869,208 | A | * | 2/1999 | Miyasaka .................... 429/224 |

* cited by examiner

Primary Examiner—Patrick Ryan
Assistant Examiner—M. Wills
(74) Attorney, Agent, or Firm—Antonelli, Terry, Stout & Kraus, LLP

(57) ABSTRACT

In order to provide a high performance secondary battery, which is suitable for applying to portable apparatus or electric vehicles, a spinel type oxide $Li_{1+x}Mn_{2-x}O_4$ (0<x<0.33) added with at least an element different from the composing element is used as an active material.

22 Claims, 1 Drawing Sheet

LITHIUM MENGANES OXIDE SECONDARY BATTERY

BACKGROUND OF THE INVENTION

The present invention relates to an active material for a lithium secondary battery using a non-aqueous electrolyte, and to a lithium ion secondary battery which uses that material.

In accordance with future development of our information society, wider use of personal computers, portable telephones, and the like can be anticipated. Accordingly, batteries, which provide the source of electric power for these portable devices, are required to have a higher energy density and a larger capacity.

Because the lithium secondary battery using a non-aqueous electrolyte has a high battery voltage and a high energy density, its development has been widely carried out. Some lithium secondary batteries are already in practical use. However, a manganese spinel material, which is used as a material for the positive electrode of the battery, has several problems in practical use.

The first problem is deterioration of the cycle life. The capacity of a spinel type oxide is decreased significantly after repeated charge-discharge operations, because trivalent manganese ion in the oxide has the Jahn-Teller instability. The second problem is one of elusion, that is, manganese tends to dissolve into the electrolyte, whereby the performance of the battery is deteriorated. The third problem is safety, that is, the positive electrode generates heat or fire when a short circuit or rupture of the battery occurs.

All of these problems can be solved by increasing the structural stability of the active material of the positive electrode. In accordance with conventional positive materials, these problems could not be solved. However, some trials have been reported.

In accordance with JP-A-6-187933 (1994) by Technology Finance Co., improvement of the cycle life and prevention of elusion are promoted by using a spinel type oxide $Li_{1+x}M_zMn_{2-x-z}O_4$ ($0 \leq x < 0.33$), wherein a composition ratio of Li to Mn, is varied, as the active material. The same advantage is expected by replacing Mn with Co. However, in accordance with this method, a problem occurs in that the initial capacity itself is decreased.

In accordance with a Laid-open patent (JP-B-9-147867 (1997)) of Mori Energy Co., improvement of the cycle life characteristics is promoted by using a spinel type oxide $Li_{1+x}M_zMn_{2-x-z}O_4$ ($0 \leq x < 0.33$, M: transition metallic element such as Co, Cr, and the like), wherein a composition ratio of Li to Mn is increased and Mn is replaced with a transition metal such as Co, Cr, and the like, as the active material. However, a cycle life of more than 1000 cycles, which is. required for practical use, can not be obtained with the proposed battery.

As described above, efforts to achieve extension of the battery life, prevention of elusion, and improvement of its safety have been tried conventionally with a stabilizing crystal structure of the material for the positive electrode by various methods. However, if extension of the battery life is achieved, the battery capacity is decreased. On the contrary, if an increase in the battery capacity is achieved, a problem in safety is generated, and heating or ignition results if a short circuit occurs.

SUMMARY OF THE INVENTION

One of the objects of the present invention is to provide a spinel type oxide active material for a positive electrode of a secondary battery and a method of manufacture thereof for providing a long life, safe, and large capacity battery.

In order to achieve the foregoing object of the present invention, an oxide having a spinel type structure defined by the chemical formula of $Li_{1+x}Mn_{2-x}O_4$ ($0 \leq x < 0.33$), which is further supplemented with at least an element other than Li, Mn, and oxygen, is used as the positive electrode material. The composition ratio of Li to Mn is called hereinafter the Li/Mn molar ratio. Increasing the Li/Mn ratio operates to decrease the lattice constant, and accordingly, the crystal structure is stabilized. The stabilization of the crystal structure operates to improve the cycle characteristics and to prevent elusion, and brings about an advantage in that the battery life characteristics are improved. However, increasing the Li/Mn ratio brings about a lowering of the theoretical capacity, and so a lowering of the initial capacity can not be avoided in practice. Practically, the capacity of the battery is defined by the capacity of the positive electrode material. Therefore, lowering the capacity of the positive electrode material is not desirable.

In accordance with the present invention, the material, which is an oxide having a spinel type structure defined by a chemical formula of $Li_{1+x}Mn_{2-x}O_4$ ($0 \leq x < 0.33$), which is further supplemented with at least an element other than Li, Mn, and oxygen, is used as the positive electrode material. The element to be added is preferably at least any one selected from the group consisting of B, P, Mg, As, Sb, Zr, Na, Be, Y, Si, Al, C, F, Bi, Pb, Ge, and Sn. The amount of the added element is preferably in the range of 0.01%–10% in molar ratio to the total amount of Mn contained in the positive electrode material. However, no problem is caused when adding an amount more than or less than the above range.

In particular, the addition of B, P, and Sb does not change its crystal structure, that is, its stability is maintained, and so an increase in its capacity can be achieved without harming its life characteristics. With a view toward increased safety, the addition of Al, Si, Ga, and mg is effective. As the composition ratio for the material to be added, the range, $0.02 < x < 0.14$, in the chemical formula $Li_{1+x}Mn_{2-x}O_4$ is most preferable.

The method of manufacturing the positive electrode material in accordance with the present invention comprises the following Steps: First, a manganese spinel type oxide to be a parent material is manufactured. $Li_2CO_3$, LiOH, $LiNO_3$, LiCOOH, $Li_2O$, and the like are used as a lithium raw material, and $MnO_2$ (either of electrolytic manganese dioxide (EMD) and chemically purified manganese dioxide (CMD) can be used), $Mn_3O_4$, $Mn_2O_3$, MnO, $MnCO_2$, MnCOOH, MnOOH, and the like are used as a manganese raw material.

A mixture of these raw materials in a designated composition ratio, or a mixed powder obtained by mixing a solution, co-precipitation, and drying, is used as a raw material. The raw material is calcined in air or in an oxygen atmosphere for 40 hours. The temperature at the calcination depends on the composition ratio, but generally a range of approximately 600° C.–900° C. is desirable. A designated amount of the additive is added to the parent material obtained by the calcination, and a heat treatment follows. The temperature of the heat treatment is desirably in the range of 400° C.–900° C. Of course, the advantage of the additive can be observed even if the heat treatment is not performed, but the heat treatment is desirable.

Furthermore, in order to solve the problem, the following active material for the positive electrode is used. The active material can be obtained by adding at least an element other than Li, Mn, and oxygen to an oxide having a spinel type structure defined by the chemical formula of $Li_{1+x}M_yMn_{2-x-z}O_4$ ($0 \leq x < 0.33$, $0 < y < 2$, M: at least a transition metal other than Mn). The element to be added is desirably at least any one selected from the group consisting of B, P, Mg, As, Sb, Zr, Na, Be, Y, Si, Al, C, F, Bi, Pb, Ge, and Sn.

Furthermore, in order to solve the problem, the following active material for a secondary battery and a lithium secondary battery using the same are provided. The active material is an oxide having a spinel type structure defined by a chemical formula of $Li_{1+x}M_yMn_{2-x-y-z}B_zO_4$ ($0 \leq x < 0.33$, $0 < y+z < 2$, M: at least a transition metal other than Mn), and the B substituting Mn is at least an element other than Li, Mn, oxygen, and the transition metal M. The B is desirably a transition metal other than the transition metal M, for instance, such as Sc, Ti, V, Cr, Mn, Fe, Co, Ni, Cu, Zn, and the like. Main group elements such as Al, Ga, In, Sn, Pb, and the like are also usable. Alkali earth metals such as Mg, Sr, Ca, and the like are also usable.

In accordance with the present invention, the above described positive electrode material is used as a parent material, and further at least an element other than Li, Mn, oxygen, the transition metal M, and the substituting metal B is added to the parent material in order to solve the problem. The element to be added is desirably at least an element selected from the group consisting of B, P, Mg, As, Sb, Zr, Na, Be, Y, Si, Al, C, F, Bi, Pb, Ge, and Sn. In order to use the material as a material for the positive electrode, the material to which the above element is added desirably is treated with heating at a temperature in the range of 400° C.–900° C.

Furthermore, in order to solve the problem, an active material for the positive electrode having a spinel type structure defined by the chemical formula of $(Li,A)_{1+x}M_yMn_{2-x-y-z}B_zO_4$ ($0 \leq x < 0.33$, $0 < y+z < 2$, M: at least a transition metal other than Mn, A: at least an element other than Li) is used. Here, (Li,A) means both Li and A are contained in the material. The B substituting Mn is at least an element other than Li, Mn, and the transition metal M, and the substituting element A is desirably at least one of Mg, Zn, Fe, Cu, and Ni. Furthermore, the positive electrode material can be prepared by adding another element to the above active material.

In order to solve the problem, the lattice constant of these spinel type oxides are made larger than 8.10 angstrom (Å) and smaller than 8.25 angstrom (Å). By selecting a material having such a small lattice constant as the positive electrode material, the cycle characteristics can be improved. As practical means, the object can be achieved by selecting an element having a small ionic radius as the substituting element, or by making the cooling velocity after calcination as slow as possible. The cooling velocity is desirably equal to or slower than 3° C./min. The same affect can be obtained by performing the calcination in an oxygen atmosphere.

The positive electrode of the secondary battery is formed with the positive electrode material of the present invention @y the following method. First, the positive electrode material is mixed with carbon, i.e. a conductor material, by kneading. Then, a resin binder is added thereto as a binding agent, and kneading is performed. The mixture then is applied onto an electrode substrate and pressed and dried.

An amorphous group carbon material, a graphite group carbon material, and the like are preferable as a negative electrode material. These negative electrode materials, even if they may consist of a material other than the above active material for an electrode, exert no influence at all on the object of the present invention. For instance, a tin oxide is usable.

As the electrolyte, an organic electrolyte, which is made by dissolving, for instance, a lithium salt selected from the group consisting of $LiClO_4$, $LiAsF_6$, $LiBF_4$, $LiPF_6$, into a non-aqueous solvent, such as propylene carbonate, propylene carbonate derivatives, ethylene carbonate, and the like; or a solid electrolyte, or a gel electrolyte, having lithium ions conductivity are usable.

The advantage of the present invention is not decreased even if a porous separator is used depending on the necessity of battery composition. The prepared positive electrode, the negative electrode, and the separator are wound into a roll around a core, i.e. a center pin, inserted into a cylindrical or rectangular container. The container is sealed after an electrolyte is filled into the container.

The uses of the battery relating to the present invention are not restricted. For instance, representative uses of the battery are for a portable information communication apparatus, a portable video apparatus, personal computers, a household electric appliance, an electric power storage apparatus, and electric vehicles. Additionally, the battery can be used as a power source, for instance, for note-type personal computers, pen-input personal computers, pocket personal computers, note-type word processors, pocket word processors, electronic book players, portable telephones, cordless branch phones, pagers, handy terminals, portable copiers, electronic note-books, electronic calculators, liquid crystal televisions, electric shavers, electric tools, electronic translators, vehicle telephones, transceivers, voice recorders, memory cards, back-up power sources, tape recorders, radios, headphone stereo-players, portable printers, handy cleaners, portable CDs, video movies, navigation systems, and others. Furthermore, the battery can be used as a power source for refrigerators, air-conditioners, televisions, stereo-players, water heaters, oven electronic ranges, dish washers, washers, dryers, game play apparatus, lighting apparatus, toys, load conditioners, medical appliance, golf carts, electric carts, and others. In addition to the above consumer products, the battery of the present invention can be used for large scale electric power storage systems for industrial use, military uses, and space uses.

BRIEF DESCRIPTION OF THE DRAWINGS

These and other objects, features and advantages of the present invention will be understood more clearly from the following detailed description with reference to the accompanying drawings, wherein:

In FIG. 1 and FIG. 2, the numeral 1 indicates cycle characteristics when boron is added to the active material $Li_{1+x}Co_yMn_{2-x-y-z}Mg_zO_4$ ($x=0.10$, $y=0.10$, $z=0.15$), the numeral 2 indicates cycle characteristics when phosphorus is added to the active material $Li_{1+x}Co_yMn_{2-x-y-z}Mg_zO_4$ ($x=0.10$, $y=0.10$, $z=0.15$), the numeral 3 indicates cycle characteristics when bismuth is added to the active material $Li_{1+x}Co_yMn_{2-x-y-z}Mg_zO_4$ ($x=0.10$, $y=0.10$, $z=0.15$), the numeral 4 indicates cycle characteristics when lead is added to the active material $Li_{1+x}Co_yMn_{2-x-y-z}Mg_zO_4$ ($x=0.10$, $y=0.10$, $z=0.15$) the numeral 5 indicates rate characteristics when tin is added to the active material $Li_{1+x}Mn_{2-x}O_4$ (x=0.08), the numeral 6 indicates rate characteristics when indium is added to the active material $Li_{1+x}Mn_{2-x}O_4$ (x=0.08), and the numeral 7 indicates rate characteristics when no additive element is added to the active material $Li_{1+x}Mn_{2-x}O_4$ (x=0.08).

DETAILED DESCRIPTION OF THE PREFERRED EMBODIMENTS

Hereinafter, details of the present invention will be explained with reference to the embodiments. However, the present invention is not restricted by the embodiments explained hereinafter.

(Embodiment 1)

First, a parent material, $Li_{1+x}Mn_{2-x}O_4$, was prepared by the following method.

Lithium carbonate and electrolytic manganese dioxide (EMD) was mixed in a designated molar ratio. Then, the mixture was calcined for approximately 10 hours to 40 hours at a temperature in the range of 650° C.–900° C. in air or an oxygen stream. The additive elements were added to the obtained mother material (in accordance with the present embodiment, x=0.08). The raw materials for adding the additive elements were boric acid, phosphate salts, and other oxides. The ratio of the addition was 0.25% to the moles of Mn in the active material.

The mixed parent material and the additive elements were heat-treated at a temperature in the range of 300° C.–600° C. for 10 hours in air. Then, in accordance with the present embodiment, the treated material was classified by a sieve having a mesh size of 45 micron. The positive electrode was manufactured by kneading the obtained powder with a binder and a conductor, applying the mixture onto an aluminum foil, and drying it after pressing. A charging-discharging test was performed using a non-aqueous electrolyte containing $LiPF_6$. Initial capacities, capacity maintaining ratios after 1000 cycles, and the advantages of the additive elements are indicated in Table 1.

TABLE 1

| Additive element | Initial capacity (mAh/g) | capacity maintaining ratio | Advantages of the additive elements |
|---|---|---|---|
| None | 107 | 98 | — |
| B | 125 | 97.5 | Increase in capacity |
| p | 128 | 98.2 | Increase in capacity |
| Al | 105 | 99.5 | Improvement in cycle characteristics, Decease in elusion, suppressing heat generation |
| Si | 102 | 99.3 | suppressing heat generation |
| Mg | 105 | 99.7 | Improvement in cycle characteristics, Decease in elusion |

These additive elements operate to stabilize the crystal structure, and accordingly, it is revealed that these additive elements contribute to an improvement of the cycle characteristics, are able to suppress heat generation, and are effective to improve safety for preventing heat and ignition.

(Embodiment 2)

Another embodiment of the present invention will be explained hereinafter.

Figure 1:
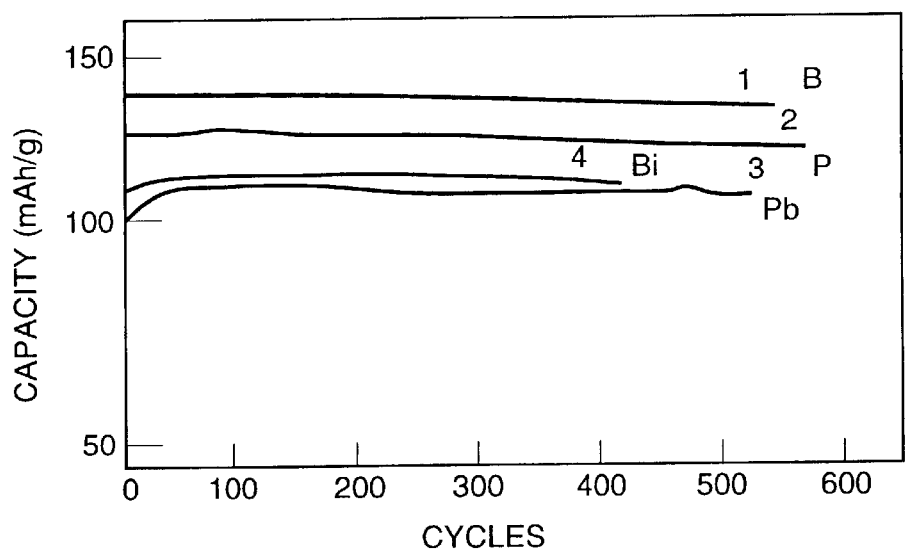
FIG. 1 is a graph indicating cycle characteristics of the secondary batteries relating to the present invention.

Another material, $Li_{1+x}Co_yMn_{2-x-y-z}Mg_zO_4$ (x=0.10, y=0.10, z=0.15) was prepared. Further, a respective one of B, Sn, Bi, Pb was added to the mother material. After adding the additive element, the mother material was heat-treated at 400° C. for 10 hours. The cycle characteristics of each respective material are indicated in FIG. 1. An increase in capacity can be observed in all the cases. Any deterioration of the cycle characteristics in comparison with the case when no additive element is added can not be observed.

(Embodiment 3)

Figure 2:
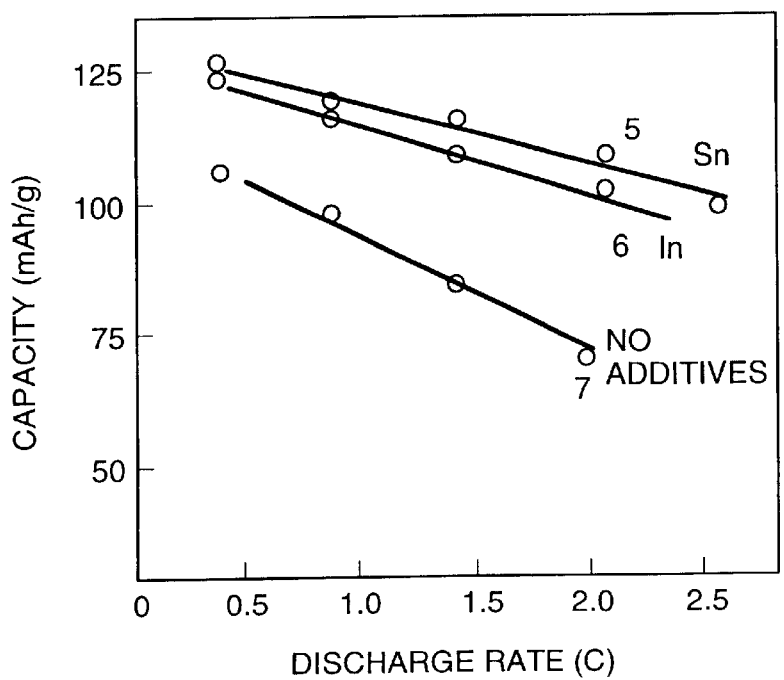
FIG. 2 is a graph indicating a relationship between the discharging capacity and the discharging rate of the secondary battery relating to the present invention.

The results obtained by study of the rate dependency of the discharging characteristics using the positive electrode of the present invention as the active material are indicated in FIG. 2. As a comparative example, a case when using the positive electrode with no additive element is also indicated. The chemical formula of the material with no additive element is $Li_{1+x}Mn_{2-x}O_4$ (x=0.08). With the spinel type positive electrode material with no additive element, the capacity is decreased in accordance with increasing discharging rate (In this case, 1C means charging is completed in one hour. Accordingly, 2C means full charging can be completed in 0.5 hours). However, it is revealed that the deterioration of the capacity is small with the material to which Sn, In is added. The effect of these additive elements is to enhance the electronic conductivity of the positive electrode active material, and, accordingly, to prevent the particles of the active material from charging-up in fast charge-discharge operation.

In accordance with the present invention, a secondary battery having a large capacity and a long life can be obtained. Accordingly, a battery having a large capacity, high safety, and a long life, which is applicable to various portable apparatus and electric vehicles, and a set of batteries thereof can be provided.

What is claimed is:

1. An active material for a secondary battery which is chargeable and dischargeable by inserting lithium ions therein, wherein at least one element other than Li, Mn, oxygen is added to an oxide having a spinel type structure defined by the chemical formula $Li_{1+x}MN_{2-x}O_4$ (0<x<0.33) by an amount in the range of 0.01% to 10% in mole ratio to the total amount of Mn.

2. An active material for a secondary battery which is chargeable and dischargeable by inserting lithium ions therein, wherein at least one element selected from the group consisting of B, P, Mg, As, Sb, Zr, Na, Be, Y, Si, Al, C, F, Bi, Pb, Ge, and Sn is added to an oxide having a spinel type structure defined by the chemical formula $Li_{1+x}Mn_{2-x}O_4$ (0<x<0.33) by an amount in the range of 0.01% to 10% in mole ratio to the total amount of Mn.

3. A method of preparing an active material for a secondary battery which is chargeable and dischargeable by inserting lithium ions therein, the method comprising the steps of:

adding at least one element other than Li, Mn, oxygen to an oxide having a spinel type structure defined by the chemical formula $Li_{1+x}Mn_{2-x}O_4$ (0<x<0.33) by an amount in the range of 0.01% to 10% in mole ratio to the total amount of Mn; and, subsequently, treating the oxide by heating at a temperature in the range of 400° C. to 900° C.

4. An active material for a secondary battery which is chargeable and dischargeable by inserting lithium ions therein, wherein at least one element other than Li, Mn, oxygen, and a transition element M in the following chemical formula is added to an oxide having a spinel type structure defined by the chemical formula $Li_{1+x}M_yMn_{2-x-y}O_4$ ($0<x<0.33$, $0<y<2$, M: at least a transition metal other than Mn) by an amount in the range of 0.01% to 10% in mole ratio to the total amount of Mn.

5. An active material for a secondary battery as claimed in claim 4, wherein
said at least one element other than Li, and the transition element M to be added to said oxide is at least one element selected from the group consisting of B, P, Mg, As, Sb, Zr, Ma, Be, Y, Si, Al, C, F, Bi, Pb, Ge, and Sn.

6. An active material for a preparing secondary battery which is chargeable and dischargeable by inserting lithium ions therein, comprising
an oxide having a spinel type structure defined by the chemical formula $Li_{1+x}M_yMn_{2-x-y-z}B_zO_4$ ($0<x<0.33$, $0<y+z<2$, M: at least a transition metal other than Mn), wherein
the element B substituting Mn is at least an element other than Li, Mn, oxygen, and the transition metal M.

7. An active material for a secondary battery as claimed in claim 6, wherein
at least one element other than Li, Mn, oxygen, the transition metal M, and the substituting element B is added to the active material by an amount in the range of 0.01% to 10% in mole ratio to the total amount of Mn.

8. An active material for a secondary battery which is chargeable and dischargeable by inserting lithium ions therein, comprising:
an oxide having a spinel type structure defined by the chemical formula $(Li,A)_{1+x}M_yMn_{2-x-y-z}B_zO_4$ ($0<x<0.33$, $0<y+z<2$ M: at least a transition metal other than Mn, A: at least an element other than Li, (Li, A) means both Li and the element A are contained); wherein
the element B substituting Mn is at least an element other than Li, Mn, and the transition metal M; and
the substituting element A is an element selected from the group consisting of Mg, Zn, Fe, Cu, and Ni.

9. An active material for a secondary battery as claimed in claim 8, wherein
at least one element other than Li, Mn, oxygen, the transition metal M, and the substituting elements B and A is added to the active material by an amount in the range of 0.01% to 10% in mole ratio to the total amount of Mn.

10. A secondary battery which is chargeable and dischargeable by inserting lithium ions therein, comprising:
a positive electrode made of a spinel type oxide as claimed in one of claims 1 to 9, wherein
the lattice constant of said oxide is larger than 8.10 angstrom and smaller than 8.25 angstrom.

11. Portable information communication apparatus, portable video, personal computers, household electric appliance, power storage systems, and electric vehicles wherein
lithium secondary battery using said active material claimed in any of claims 1 to 9 is used as a power source.

12. A lithium secondary battery which is chargeable and dischargeable by inserting lithium ions therein, comprising a positive electrode made of an active material, wherein, in the active material at least one element other than Li, Mn, oxygen is added to an oxide having a spinel type structure defined by the chemical formula $Li_{1+x}Mn_{2-x}O_4$ ($0<x<0.33$) by an amount in the range of 0.01% to 10% in mole ratio to the total amount of Mn.

13. A lithium secondary battery which is chargeable and dischargeable by inserting lithium ions therein, comprising a positive electrode made of an active material, wherein, in the active material, at least one element selected from the group consisting of B, P, Mg, As, Sb, Zr, Na, Be, Y, Si, Al, C, F, Bi, Pb, Ge, and Sn is added to an oxide having a spinel type structure defined by the chemical formula $Li_{1+x}Mn_{2-x}O_4$ ($0<x<0.33$) by an amount in the range of 0.01% to 10% in mole ratio to the total amount of Mn.

14. A lithium secondary battery which is chargeable and dischargeable by inserting lithium ions therein, comprising a positive electrode made of an active material, wherein, in the active material, at least one element other than Li, Mn, oxygen, and a transition element M in the following chemical formula is added to an oxide having a spinel type structure defined by the chemical formula $Li_{1+x}M_yMn_{2-x-y}O_4$ ($0<x<0.33$, $0<y<2$, M: at least a transition metal other than Mn) by an amount in the range of 0.01% to 10% in mole ratio to the total amount of Mn.

15. A secondary battery as claimed in claim 4, wherein
said at least one element other than Li, and the transition element M to be added to said oxide is at least one element selected from the group consisting of B, P, Mg, As, Sb, Zr, Ma, Be, Y, Si, Al, C, F, Bi, Pb, Ge, and Sn.

16. A lithium secondary battery which is chargeable and dischargeable by inserting lithium ions therein, comprising a positive electrode made of an active material, wherein said active material includes an oxide having a spinel type structure defined by the chemical formula $Li_{1+x}M_yMn_{2-x-y-z}B_zO_4$ ($0<x<0.33$, $0<y+z<2$, M: at least a transition metal other than Mn), wherein
the element B substituting Mn is at least an element other than Li, Mn, oxygen, and the transition metal M.

17. A secondary battery as claimed in claim 6, wherein at least one element other than Li, Mn, oxygen, the transition metal M, and the substituting element B is added to the active material by an amount in the range of 0.01% to 10% in mole ratio to the total amount of Mn.

18. A lithium secondary battery which is chargeable and dischargeable by inserting lithium ions therein, comprising a positive electrode made of an active material, wherein said active material includes an oxide having a spinel type structure defined by the chemical formula $Li,A)_{1+x}M_yMn_{2-x-y-z}B_zO_4$ ($0<x<0.33$, $0<y+z<2$ M: at least a transition metal other than Mn, A: at least an element other than Li, (Li, A) means both Li and the element A are contained); wherein
the element B substituting Mn is at least an element other than Li, Mn, and the transition metal M; and
the substituting element A is an element selected from the group consisting of Mg, Zn, Fe, Cu, and Ni.

19. A secondary battery as claimed in claim 8, wherein at least one element other than Li, Mn, oxygen, the transition metal M, and the substituting elements B and A is added to the active material by an amount in the range of 0.01% to 10% in mole ratio to the total amount of Mn.

20. An active material for a secondary battery as claimed in claim 2, wherein the at least one element is selected from the group consisting of B, P and Sb.

21. An active material for a secondary battery as claimed in claim 2, wherein the at least one element is selected from the group consisting of Al, Si, Ga and Mg.

22. An active material for a secondary battery as claimed in claim 1, wherein $0.02<x<0.14$.

* * * * *